United States Patent [19]

Brush et al.

[11] 3,715,479

[45] Feb. 6, 1973

[54] TINT CONTROL CIRCUIT USING PHASE SPLITTER

[75] Inventors: R. John H. Brush; George W. Singleback, both of Chesapeake, Va.

[73] Assignee: General Electric Company

[22] Filed: April 9, 1971

[21] Appl. No.: 132,772

[52] U.S. Cl........178/5.4 HE, 178/5.4 MC, 307/262, 332/29 R

[51] Int. Cl...............................................H04n 9/44

[58] Field of Search.......178/5.4 R, 5.4 HE; 307/262; 323/124; 332/29 R, 29 M

[56] References Cited

UNITED STATES PATENTS 3,593,203 7/1971 King et al...........................332/29 R 2,805,386 9/1957 Pfaff....................................323/124

3,527,964 9/1970 Hansen et al....................178/5.4 HE

*Primary Examiner*—Robert L. Richardson

*Attorney*—Frank L. Neuhauser, Oscar B. Waddell, Joseph B. Forman, W. J. Shanley, Stanley C. Corwin and F. W. Powers

[57] ABSTRACT

Opposed-phase 3.58 MHz subcarrier signals are applied to opposite ends of a circuit comprising the series combination of a resistor and a variable inductor. An output taken at the junction between the resistor and inductor produces a sinusoidal voltage whose magnitude remains substantially constant and whose phase may be varied by changing the value of the inductor. In a further embodiment a capacitor is connected in series with the inductor to afford a broader range of phase control.

3 Claims, 3 Drawing Figures

PATENTED FEB 6 1973 3,715,479

INVENTORS
R. JOHN H. BRUSH
BY & GEORGE W. SINGLEBACK
James E. Espe
THEIR ATTORNEY

TINT CONTROL CIRCUIT USING PHASE SPLITTER

BACKGROUND OF THE INVENTION

The present invention relates to color television receivers and, more specifically, to means for operating upon signals produced therein. In present-day color television receivers, chroma information is received in the form of the sidebands of a pair of modulated 3.58 MHz sinusoidal signals which have been combined in quadrature. Demodulation of the chroma signals may advantageously be accomplished by suitable synchronous demodulators, each demodulator receiving both the composite chroma signal and a 3.58 MHz subcarrier for demodulating the appropriate chroma information.

The phase relationship between the subcarrier and the received chroma signal is critical, since the relative phase angle between the two determines the hues to be produced by the demodulated signal. It has thus been found necessary to provide means for adjusting the relative phase of the 3.58 MHz subcarrier to compensate for changes and aberrations in the received chroma signal, and for changes in the characteristics of receiver components due to aging and variations in ambient temperature.

One way of providing phase shifting means for the 3.58 MHz subcarrier which has gained favor in the design of color television receivers is to place a varactor diode in shunt between a line carrying the 3.58MHz signal and ground. A voltage divider connected between a source of direct voltage and ground provides a reference voltage to be applied to the diode, the capacitance afforded by the diode being a function of the voltage impressed thereacross. Various disadvantages inhere in this arrangement; for instance, the arrangement is limited in range since RF signals occurring in the signal path serve to bias the diode when the diode is operating in the low-capacity range. Further, the amplitude of the phase-shifted signal is caused to vary by changes in the capacitance of the varactor. This is a particularly undesirable characteristic in a receiver where balanced diode demodulators are utilized, since an imbalance is thereby produced. Further, the network comprising a varactor and associated biasing means is relatively expensive, and the characteristics of many of the less expensive varactor units are undesirably inconsistent. It will therefore be seen that there is a need for providing improved economical means for shifting the phase of a 3.58 MHz subcarrier in a color television receiver.

It is therefore an object of the present invention to provide improved means for varying the phase of a subcarrier signal in a color television receiver.

It is a further object of the present invention to provide in a color television receiver means for shifting the phase of a subcarrier which produces a signal having a relatively constant amplitude.

SUMMARY OF THE INVENTION

Briefly stated, in accordance with one aspect of the present invention, the foregoing objects are achieved by providing phase splitting means for deriving first and second sinusoidal signals in response to the application of a 3.58 MHz subcarrier. The derived sinusoidal signals each have a frequency of 3.58 MHz but are 180° out of phase. A circuit is connected between points at which the oppositely phased signals are present, such that the net signal across the circuit comprises a 3.58 MHz sine wave having an amplitude which is the sum of the split-phase signals. In a first embodiment, the circuit comprises a series combination of a resistor and a variable inductor, which may advantageously take the form of a saturable reactor. Output voltage is taken at the intersection of the resistor and the inductor. As the value of the inductor changes, the phase of the current flowing through the series circuit changes correspondingly with the result that the phase of the output voltage is varied.

In a further embodiment, a capacitor is connected in series with the inductor. The value of the capacitor is advantageously selected so that resonance of the inductor-capacitor combination takes place at some point near the mid-range of the variable inductor. Current flowing through the series circuit is thus caused to lead or lag its original phase relationship, depending on the relative value of the inductor. A broader range of phase shift is thus afforded while maintaining the advantage of having the magnitude of the output voltage remaining substantially constant.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment, taken in conjunction with the accompanying drawing in which:

DESCRIPTION OF THE PREFERRED EMBODIMENTS

Figure 1:
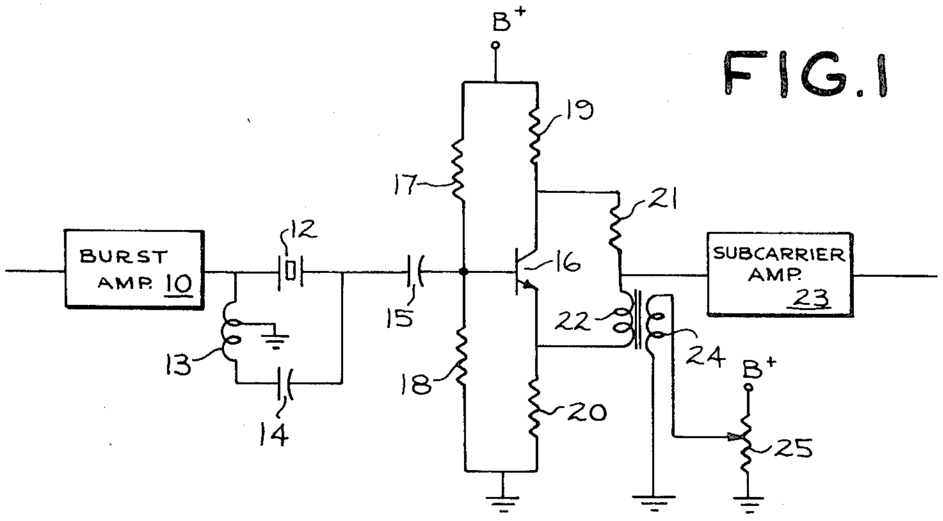
FIG. 1 is a schematic diagram showing a preferred embodiment of the inventive phase shift circuit.

Referring now to FIG. 1, selected portions of a color television receiver are shown, including a burst amplifier 10 for deriving bursts of a 3.58 MHz subcarrier signal from the "back porch" of the horizontal synchronizing signal of a composite video signal. The 3.58 MHz signal so derived is applied to an oscillator comprised of crystal 12, center-tapped inductor 13 and capacitor 14. The combination of the crystal, the inductor and capacitor is tuned to resonate at the subcarrier frequency, providing a continuous sinusoidal signal having a frequency of 3.58 MHz. The signal so provided is transmitted through coupling capacitor 15 to the base of a transistor 16 which operates as a phase splitter, as will be set forth below. Resistors 17 and 19 connect the base and collector terminals, respectively, of transistor 16 to a source of biasing potential. Resistors 19 and 20 connect the base and emitter terminals, respectively, to a source of common potential, represented here as ground. The combination of a resistor 21 and a variable inductor 22 are connected in series between the emitter and collector terminals of transistor 16. An output signal derived at the intersection of resistor 21 and inductor 22 is applied to a subcarrier amplifier 23. As will be appreciated by those skilled in the art, subcarrier amplifier 23 increases the magnitude of the received signal and transmits it to a pair of synchronous demodulators (not shown) for demodulating a chroma signal.

Variable inductor 22 advantageously comprises a saturable reactor and has a saturating winding 24 adapted to be connected across a source of DC potential. In the illustrated embodiment, one end of saturating winding 24 is connected directly to ground, the other end being coupled to the slider of a potentiometer 25. The resistive element of potentiometer 25 is connected between a source of biasing potential and ground.

Figure 3:
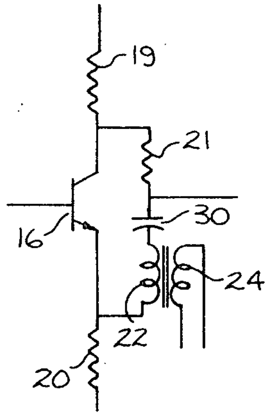
FIG. 3 is a partial schematic diagram showing a further embodiment of the present invention.

FIG. 3 shows a further embodiment of the circuit of FIG. 1, wherein a capacitor 30 is connected in series between resistor 21 and variable inductor 22, an output signal being taken from the intersection of resistor 21 and capacitor 30.

The operation of the present circuit will now be described, with reference to various numerals of FIG. 1. Burst amplifier 10 periodically applies 3.58 MHz subcarrier to the resonant circuit comprised of crystal 12, inductor 13 and capacitor 14 for causing the circuit to output a continuous sine wave at 3.58 MHz which is in synchronism with the short burst of subcarrier transmitted at the "back porch" of the horizontal synchronizing pulse. The continuous wave so produced may be amplified and utilized to demodulate components of the chroma signal, producing electrical signals which are applied to the appropriate control grids of a cathode ray tube. In order to provide the receiver with the capability of varying the relative phase of the subcarrier, a phase shift network is coupled to the resonant circuit by means of a coupling capacitor 15. The continuous-wave subcarrier signal traverses capacitor 15 and is applied to the base terminal of transistor 16, causing the transistor to conduct current therethrough as a function of the applied 3.58 MHz subcarrier. When transistor 16 is non-conductive, it will be seen that the voltage at the emitter terminal thereof approaches ground potential due to the relative impedances of resistors 19, 20 and 21 and inductor 22. However, when current is passed by the transistor an increased voltage drop occurs across resistor 20, with the result that the voltage at the emitter terminal of the transistor rises in a manner reflecting the characteristics of the signal impressed upon the base terminal thereof. Similarly, when transistor 16 is nonconductive only a small voltage drop appears across resistor 19 and thus the voltage at the collector terminal of the transistor approaches the value of the biasing source. As transistor 16 begins to conduct, the current traversing resistor 19 produces an increased voltage drop such that the collector terminal voltage of the transistor is lowered. As transistor 16 conducts still more current, the voltage drops across both resistors 19 and 20 increase such that the collector voltage of the transistor decreases, while the emitter voltage increases. Sinusoidal variation of the conductivity of the transistor thus produces sinusoidal voltages at the emitter and collector thereof which are of opposing polarities, i.e., directly opposed in phase. The voltage appearing between the emitter and collector terminals comprises the vector difference of the two signals thus produced, comprising a sinusoidal signal of the same frequency as the 3.58 MHz signal applied to the base terminal, but having an amplitude which is the sum of the signals seen at the emitter and the collector of transistor 16.

In the present invention, circuit means are connected between the emitter and collector of transistor 16 for deriving a signal having the same frequency as the split-phase voltages provided at the emitter and collector of the transistor, but whose phase may be varied. The circuit comprises a first resistance 21 coupled in series with a variable inductor 22, the output of the circuit being taken at the junction therebetween. By making one of the impedances reactive, the phase of the current flowing through the series circuit may be modified by varying the value of the reactance. While inductor 22 may be any suitable inductor having the necessary properties it has been found advantageous to utilize a saturable reactor whose control winding is adapted to receive varying amounts of DC current. As DC current through the control winding 24 increases, the magnetic core of inductor 22 becomes more saturated, with the result that the inductance thereof decreases. By applying less voltage, and thus less current, to the control winding the core of inductor 22 may be saturated to a lesser degree, or the biasing voltage may be removed from the control winding to obtain the full inductive value of inductor 22.

With variable inductor 22 at its full value, the maximum available phase shift of the current through the series circuit is attained. In this case, the current is out of phase with the 3.58 MHz voltages appearing at the emitter and collector of transistor 16. The resulting excursion in phase of the output voltage taken at the intersection of resistor 21 and inductor 22 is reflected by the signal outputted by subcarrier amplifier 23 and applied to the succeeding demodulator stages. When the control winding 24 of inductor 22 is energized so as to minimize the inductance of the inductor, current flowing through the series circuit has a commensurately smaller reactive component, and the voltage produced at the intersection of resistor 21 and inductor 22 more closely approaches the phase of the applied 3.58 MHz signal.

Figure 2:
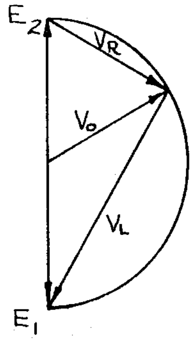
FIG. 2 is a phasor diagram illustrating the operation of one embodiment of the present invention.

FIG. 2 is a phasor diagram showing the voltages appearing at the collector and the emitter terminals of transistor 16, denoted $E_2$ and $E_1$ respectively, in opposed phase relationship. A voltage $V_R$ occurs across resistor 21, and voltage $V_L$ across inductor 22. As will be recognized by those skilled in the art, voltage drops across resistor 21 and inductor 22 must always be displaced in phase by 90° with respect to one another. The locus of the intersection of $V_R$ and $V_L$ thus comprises a semicircle extending from $E_2$ to $E_1$. Output voltage $V_0$ is taken between ground, here represented as the origin of phasors $E_2$ and $E_1$, and the intersection of resistor 21 and inductor 22. $V_0$ thus follows the semicircular locus, indicating a theoretically total available phase shift of 180°, with the magnitude of $V_0$ remaining constant. It will be appreciated that as the impedance of inductor 22 approaches infinity, the voltage $V_0$ seen at the output terminal is $E_2$. Similarly, should the impedance of inductor 22 approach zero, the output voltage $V_0$ will be identical with voltage $E_1$. Between these extremes the phase of $V_0$ can be operated upon by varying the value of inductor 22, while the magnitude of $V_0$ remains constant.

It will be understood that in practice, the limits of $V_0$ shown in the phasor diagram of FIG. 2 are not fully attainable since it is practically impossible to have the impedance of inductor 22 approach either infinity or zero. The total phase shift available in practice is thus considerably more limited than the theoretically available 180°.

In order to enhance the operation of the circuit, and to add to the available phase shift, the circuit of FIG. 3 may be utilized. A capacitor 30 may be coupled in series with inductor 22 for providing a further opposing reactance to the series circuit heretofore comprised of resistor 21 and inductor 22. Capacitor 30 is advantageously selected to have a value which, in combination with inductor 22, produces resonance in the circuit near the mid-range of the variable inductor. As will be understood by those skilled in the art, at the point of resonance no reactance is extant in the series circuit, and the signal derived across resistor 21 may be considered to be at a phase angle of zero. When the inductive value of inductor 22 is lowered, the reactive impedance of capacitor 30 dominates the circuit characteristic and a leading phase angle is produced. Similarly, as value of inductor 22 is adjusted toward its maximum, the output signal lags the zero phase angle by progressively greater amounts.

Although various types of variable reactance elements may be used with the network described herein, it has been found particularly advantageous to utilize a fixed capacitor in conjunction with a saturable reactor for providing circuit reactance. The saturable reactor lends itself to use with simple and inexpensive current adjusting means, such as a potentiometer adapted to be connected to a suitable biasing voltage source. The potentiometer may be located remotely from the reactor, precluding complications which sometimes arise when a high voltage, high frequency signal is directed to distant areas of a receiver chassis. Potentiometer 25, on the other hand, may be disposed at any convenient location within a television receiver and comprises an inexpensive, infinitely variable adjusting means. Further, the response of the system to the changes in the position of the slider of the potentiometer may be modified as desired simply by providing a resistive element for potentiometer 25 which has the desired characteristic.

While it will be understood that the values of the various circuit components may be varied to suit a particular application, the following values of circuit components are given by way of example:

| | |
|---|---|
| capacitor **15** | 0.01 microfarads |
| transistor **16** | 2N3858 A |
| resistor **17** | 22 kilohms |
| " **18** | 10 " |
| " **19** | 310 ohms |
| " **20** | 470 " |
| " **21** | 1.3 kilohms |
| inductor **22** | 200 microhenrys |
| capacitor **30** | 30 picofarads |

As will be evident from the foregoing description, certain aspects of the invention are not limited to the particular details of construction of the examples illustrated, and it is therefore contemplated that other modifications or applications will occur to those skilled in the art. It is therefore intended that the appended claims shall cover such modifications and applications that do not depart from the true spirit and scope of the invention.

What is claimed as new and desired to be secured by Letters Patent of the United States is:

1. In a color television receiver including means for deriving a subcarrier signal:

phase splitting means adapted to receive the subcarrier signal, said phase splitting means comprising a transistor having a control terminal, an input terminal and an output terminal;

first resistive means for coupling said input terminal to a point at a first reference potential;

second resistive means for coupling said output terminal to a point at a second reference potential;

means for applying the subcarrier signal to said control terminal;

circuit means including the series combination of a third resistive means and saturable reactor means, said circuit means being coupled between said input and said output terminals of said transistor means; and means for adjustably applying direct current to the control winding of said saturable reactor means whereby the phase of a signal arising between said third resistive means and said saturable reactor means varies as a function of the magnitude of the direct current.

2. The invention as defined in claim 1, further including capacitor means connected in series with said saturable reactor means and said third resistive means.

3. In a color television receiver including means for deriving a subcarrier signal:

phase splitting means adapted to receive said subcarrier signal for producing a first and second signal having the same frequency as said subcarrier signal but being mutually opposed in phase;

resistive means;

saturable reactor means having an inductive winding and a control winding;

means for coupling said resistive means and said saturable reactor means in series relationship to form a series circuit;

second circuit means for applying said first and said second signal to opposite ends of said series circuit;

potentiometer means comprising a resistive element and an adjustable terminal;

second means for coupling said control winding between said adjustable terminal and a point of reference potential; and third means for coupling said resistive element between a point of direct potential and a point of reference potential whereby movement of said adjustable slider effects a change in the phase of a signal arising between said resistive means and said saturable reactor means.

* * * * *